United States Patent
Kaji et al.

(10) Patent No.: US 9,623,710 B2
(45) Date of Patent: Apr. 18, 2017

(54) PNEUMATIC TIRE

(75) Inventors: Yoshio Kaji, Kodaira (JP); Ryoichi Watabe, Kodaira (JP); Kentaro Saeki, Kodaira (JP); Makoto Kurokawa, Kodaira (JP)

(73) Assignee: BRIDGESTONE CORPORATION, Chuo-Ku, Tokyo (JP)

(*) Notice: Subject to any disclaimer, the term of this patent is extended or adjusted under 35 U.S.C. 154(b) by 1388 days.

(21) Appl. No.: 12/602,399

(22) PCT Filed: May 29, 2008

(86) PCT No.: PCT/JP2008/059949
§ 371 (c)(1),
(2), (4) Date: Feb. 25, 2010

(87) PCT Pub. No.: WO2008/146890
PCT Pub. Date: Dec. 4, 2008

(65) Prior Publication Data
US 2010/0154953 A1 Jun. 24, 2010

(30) Foreign Application Priority Data

| May 29, 2007 | (JP) | ................................ | 2007-142402 |
| Oct. 9, 2007 | (JP) | ................................ | 2007-263319 |
| Nov. 29, 2007 | (JP) | ................................ | 2007-308789 |

(51) Int. Cl.
B60C 11/12 (2006.01)
(52) U.S. Cl.
CPC .......... B60C 11/12 (2013.01); B60C 11/1218 (2013.04); B60C 11/1263 (2013.04)
(58) Field of Classification Search
CPC ............. B60C 11/1218; B60C 11/1263; B60C 11/1281
(Continued)

(56) References Cited

U.S. PATENT DOCUMENTS 7,225,844 B2  6/2007  Lagnier
8,002,005 B2*  8/2011  Sakamaki ................ 152/209.22
(Continued)

FOREIGN PATENT DOCUMENTS

EP  1 837 207 A1  9/2007
JP  8-175115 A   7/1996
(Continued)

OTHER PUBLICATIONS

English machine translation of Umemoto (JP2001-219716), dated Aug. 2001.*

(Continued)

*Primary Examiner* — Steven D Maki
*Assistant Examiner* — Robert Dye
(74) *Attorney, Agent, or Firm* — Sughrue Mion, PLLC

(57) ABSTRACT

A pneumatic tire having enhanced on-ice braking performance achieved by further increasing the amount of water that can be sucked up into sipes. In the pneumatic tire, blocks (26) partitioned by circumferential grooves and lateral grooves are formed in the tread. A sipe (28) is formed in a block (26), and a fine structure (32) having a height in the range of from 1/50 of the sipe width t to less than 1/10 of the sipe width t is formed on a sipe wall surface. This reduces fluid friction coefficient of water relative to the sipe wall surface to a lower level than conventional products. As a result, when water staying on ice comes into contact with the sipe wall surface, the water is more easily sucked up into the sipe. The construction increases the amount of water that can be sucked up into the sipe (28) or the removal amount of water that stays on ice etc., and this enhances braking performance (friction characteristics) on ice.

8 Claims, 17 Drawing Sheets

(58) Field of Classification Search
USPC ............ 152/209.21, 209.22, 209.23, DIG. 3
See application file for complete search history.

(56) References Cited

U.S. PATENT DOCUMENTS

| | | | |
|---|---|---|---|
| 2002/0139164 A1* | 10/2002 | Ishihara | ........................ 72/326 |
| 2003/0111150 A1* | 6/2003 | Zimmer | ................ B60C 11/00 |
| | | | 152/209.19 |

FOREIGN PATENT DOCUMENTS

| | | | |
|---|---|---|---|
| JP | 8-258515 A | | 10/1996 |
| JP | 2001-219716 A | | 8/2001 |
| JP | 2003-182314 A | | 7/2003 |
| JP | 2004-224213 A | | 8/2004 |
| JP | 2005-505456 A | | 2/2005 |
| JP | 2005-067274 | * | 3/2005 |
| JP | 2005-67274 A | | 3/2005 |
| JP | 2006-193088 A | | 7/2006 |
| JP | 2008030635 A | | 2/2008 |
| WO | 2005/123420 A1 | | 12/2005 |
| WO | 2006/013694 A1 | | 2/2006 |
| WO | 2007/004369 A1 | | 1/2007 |

OTHER PUBLICATIONS

English machine translation of JP2005-067274, dated Mar. 2005.*
International Search Report dated Jul. 22, 2008.
Supplementary European Search Report issued in the corresponding European application No. 08777010.3 dated Aug. 3, 2011.
Japanese Office Action, dated Nov. 27, 2012, issued in corresponding Japanese Patent Application No. 2009-516360.

* cited by examiner

PNEUMATIC TIRE

TECHNICAL FIELD

The present invention relates to a pneumatic tire with plural blocks having sipes formed in a tread.

RELATED ART

The letting out of water generated on ice through sipes formed in treads of tires has previously been performed in order to raise the braking performance on ice. However, since previously the amount of water that can be sucked up by the sipes was not large, it was difficult to secure a sufficient path for water to be let out, particularly at temperatures where water is readily generated on an icy surface. Therefore, there have been cases where a state arises in which the tread rides on a film of water, and it has been difficult to obtain a sufficient water sucking up effect by sipes.

Sipe structures disclosed in Patent Publications 1 and 2 have been considered as a counter measures to the above. Also, a so-called tusked sipe is disclosed in Patent Publication 3, with projections formed to the sipe internal walls, preventing the sipe from adopting a collapsed state and securing a water discharge path.

However, realization of a pneumatic tire that can obtain an even greater water sucking up effect that of Patent Publications 1 to 3 would further raise braking performance on ice, and is desired.

Note that there is the difficulty that when the sipe volume in Patent Publications 1 and 2 is made too large, in order to try and increase the amount of water sucking up, the block rigidity decreases, and actually the water sucking up ability decreases.

Patent Publication 1: Japanese Patent Application Laid-Open (JP-A) No. 2005-505456
Patent Publication 2: JP-A No. 8-175115
Patent Publication 3: International Publication No. WO2006013694.

DISCLOSURE OF THE INVENTION

Problem to be Solved by the Invention

The present invention is made in consideration of the above circumstances, and an object thereof is to provide a pneumatic tire with raised braking performance on ice by further increasing the amount of water that can be sucked up within sipes.

Method of Solving the Problem

The present inventors have undertaken extensive investigations into raising the speed of sucking water up with sipes. Attention has focused on the fluid friction resistance of water when water is being sucked up in a sipe.

As shown in FIG. 12, a curve Q is traced out as the fluid velocity distribution between two flat parallel plates when the flat plate surfaces are smooth flat surfaces, and a curve P is traced out when the flat plate surfaces are water repelling surfaces with a fine structure thereon. This is therefore applicable to the surface profile characteristics of a sipe wall face of rubber having water repelling properties, and the fluid friction in the laminar flow region is reduced.

The present inventors have considered utilizing the above, and after much experimentation and further investigations have arrived at the present invention.

The first aspect features a tread formed with plural blocks partitioned by circumferential direction grooves and transverse grooves; at least one sipe formed in the block; a projection formed to at least one location on a wall face of the sipe, projecting out with a height that is half the sipe width or greater; and a fine structure formed to at least one portion of the wall face of the sipe with a fundamental height in the range of from $\frac{1}{50}$ of the sipe width to less than $\frac{1}{10}$ of the sipe width.

The fundamental here means a unit of a geometrical decorative pattern with regular repetitions, or a combination thereof.

The height of the fine structure is a height in the range of from $\frac{1}{50}$ of the sipe width to less than $\frac{1}{10}$ of the sipe width. When it is less than $\frac{1}{50}$ thereof, sufficient reduction in fluid friction resistance cannot be achieved, When it is $\frac{1}{10}$ thereof or greater, this actually becomes an impediment to flow of water in the sipe.

The height of the fine structure is more preferably a height set as a fundamental height in the range of $\frac{1}{40}$ to $\frac{3}{40}$ of the sipe width, and is even more preferably a height set as a fundamental height in the range of $\frac{1}{20}$ to $\frac{1}{16}$ of the sipe width.

In the first aspect, since the above fine structure is formed to the sipe wall face, the fluid friction coefficient of water against the sipe wall face is reduced to lower than is conventionally the case. Thereby, when standing water on ice, or the like, flows at the sipe wall face, the water is readily sucked up into the sipe. Consequently, by increasing the amount of water that can be sucked into the sipes, namely the amount of standing water on ice, or the like, that can be removed, the braking performance (frictional properties) can be further raised.

It should be noted that while the direction that sipes extend in is often the tire width direction, the above effect is seen even for other directions than this. For example, sipes may also extend along the tire circumferential direction.

In addition, even by forming the above fine structure on only one of the wall faces of the sipes the above effect can be seen, however by forming the fine structure on both of the wall faces of the sipes, the above effect can be seen more significantly.

The second aspect features the projection as being continuous to the sipe groove bottom and extending out into the sipe.

In the second aspect, since mutual surface contact of the wall faces of the sipes with each other is prevented, sipe volume can be secured. In addition, blocks are prevented from tilting over even though sipes are formed thereto.

The projection is also formed continuous to the sipe groove bottom. By so doing, during tire rotational motion, mutual contact of the wall faces of the sipes can be avoided by the projections. Consequently, not only can discharge water volume in the sipes be secured, but also a flow path to inside the sipe can also be secured, and the braking performance on ice is even further raised.

The third aspect features the projection being continuous to both wall faces of the sipe.

The fourth aspect features the projection forming a standing projection by a bar shape extending out toward the tire radial direction outside, and a void being formed at both sides of the projection in the sipe width direction.

Thereby, mutual contact of the wall faces of the sipes with each other is avoided by the standing projection. In addition blocks are prevented from tilting over by the standing projection even though sipes are formed thereto.

The fifth aspect features the height of the standing projection from the sipe groove bottom being in the range of 30 to 90% of the depth of the sipes.

When less than 30%, since it is difficult to sufficiently avoid mutual contact of the wall faces of the sipes with each other, discharge water volume cannot be sufficiently secured. However, if greater than 90%, then this impedes flow and so water discharging ability decreases.

Note that in order to better exhibit the above effect the height of the standing projection from the sipe groove bottom is preferably in the range of 40 to 80% of the depth of the sipes.

The sixth aspect features both ends of the sipes being open to the circumferential direction grooves or to the transverse grooves.

In the sixth aspect, any air inside the sipes that has accompanied the sucking up of water is driven out from both ends of the sipes toward the circumferential direction grooves, Namely, since it is there is no need overcome the pressure of air in the sipe in order to be sucked up in the sipe, the amount of water sucked up, and the speed at which water is sucked up can be made higher in comparison to closed sipes in which both ends of the sipe are not open to the circumferential direction grooves.

The seventh aspect features the fine structure being of a mesh shape. By so doing, reducing the fluid friction resistance becomes possible with a simple structure.

The eighth aspect features the sipe width being 0.3 mm to 0.8 mm. This is because structuring sipes with a sipe width that is less than 0.3 mm is difficult, and when the sipe width is greater than 0.8 mm then there is a large amount of tilting in of the blocks, with this readily leading to the contact surface with the road surface becoming smaller.

The ninth aspect features at least one of the sipes being a 3-dimensional sipe that extends and changes shape along both directions of the sipe depth direction and the sipe length direction at the tread surface.

By so doing, a combination with the effect due to providing a 3-dimensional sipe can be exhibited.

The tenth aspect features the 3-dimensional sipe extending in a zig-zag shape in the tire width direction, the tire circumferential direction, and the tire radial direction.

Thereby the effect due to the seventh aspect can be exhibited with a 3-dimensional sipe of simple structure.

The eleventh aspect features the height of the standing projection from the sipe groove bottom being in the range of 50 to 90% of the depth of the sipe.

Thereby, the depth of a portion of the 3-dimensional sipe can be made sufficiently shallow to sufficiently raise the block rigidity, while also sufficiently bringing out the functionality of the 3-dimensional sipe, and the initial braking performance on snow can be sufficiently raised.

Effect of the Invention

According to the present invention, by further increasing the amount of water that can be sucked up within sipes, a pneumatic tire can be made with raised braking performance on ice.

BEST MODE OF IMPLEMENTING THE INVENTION

Explanation will now be given of exemplary embodiments of the present invention, with examples of exemplary embodiments given.

First Exemplary Embodiment

Figure 1:
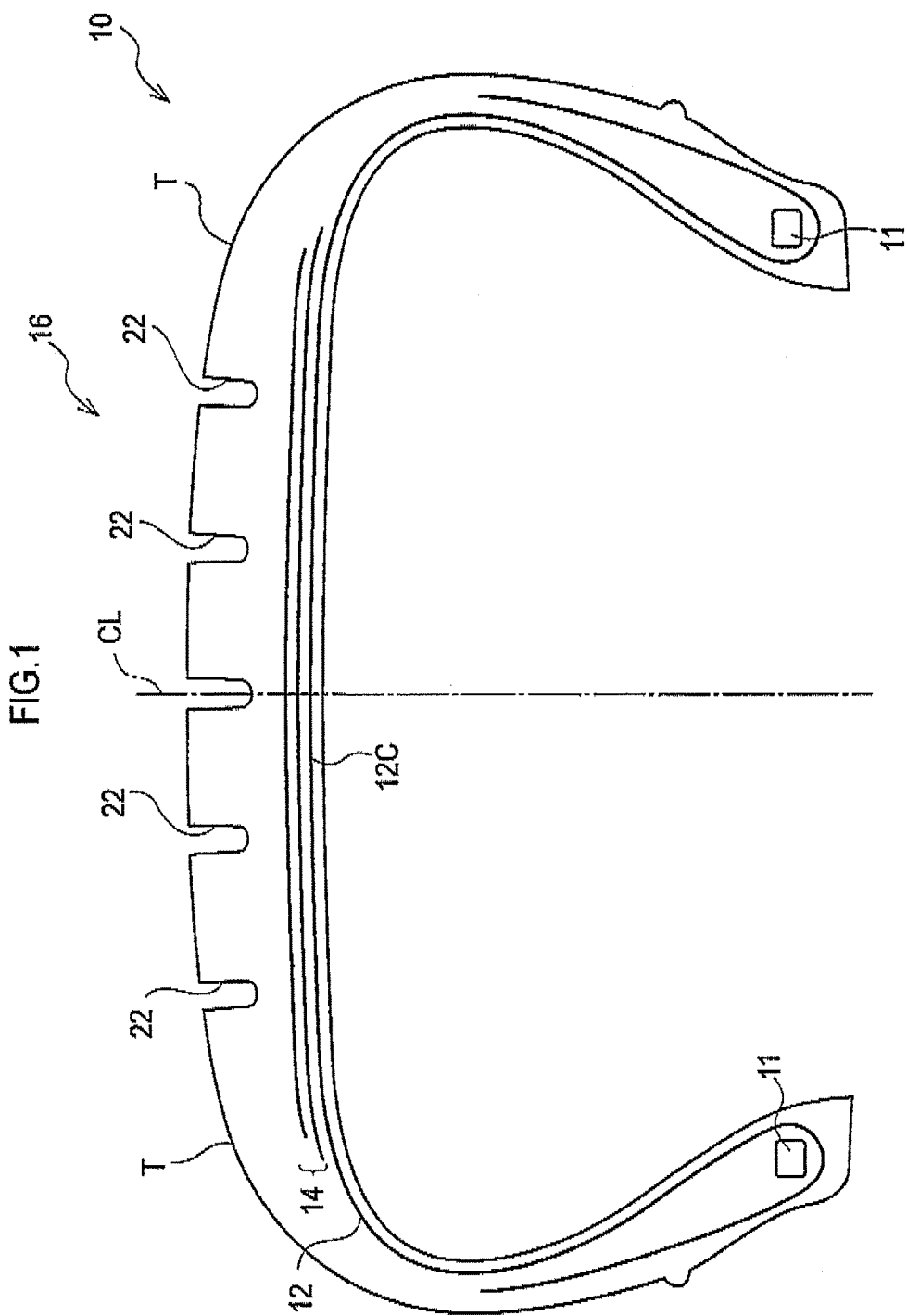
FIG. 1 is a tire radial direction cross-section of a pneumatic tire according to a first exemplary embodiment.

Explanation will first be given of a first exemplary embodiment. As shown in FIG. 1, a pneumatic tire 10 according to the present exemplary embodiment is equipped with a carcass 12 configured from a single layer, or from plural layers, wrapped around bead cores 11 at each edge thereof.

A belt layer 14 is buried within the tire at the tire radial direction outside of a crown portion 12C of the carcass 12, the belt layer 14 being configured with plural overlapping sheets (for example two sheets) of belt ply.

Figure 2:
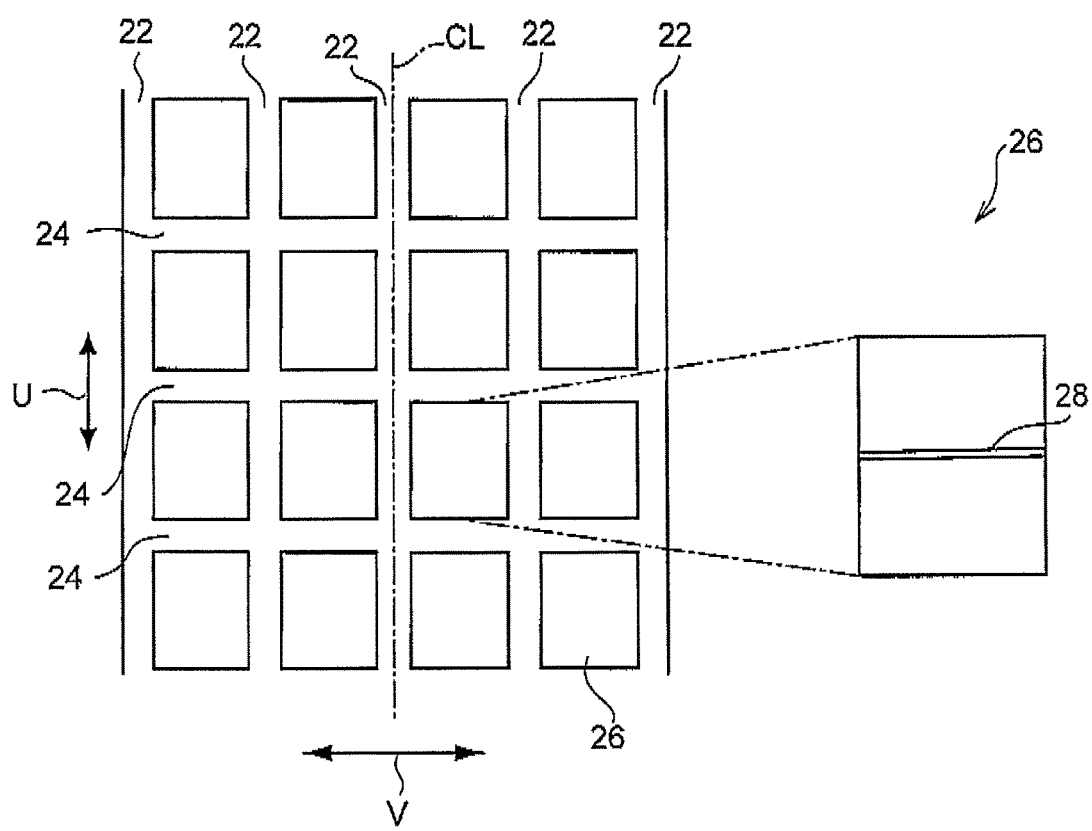
FIG. 2 is an explanatory diagram showing block disposition of a tread of a pneumatic tire according to the first exemplary embodiment in plan view.

A tread 16 is formed at the radial direction of the tire outside of the belt layer 14, and grooves are disposed in the tread 16. The tread 16, as shown in FIG. 2, has plural circumferential direction grooves (main grooves) 22 formed so as to run along the tire circumferential direction U on the plane of the tire equator CL, and on both sides thereof. Plural transverse grooves 24 are also formed in the tread 16 intersecting with the tire circumferential direction U. In the present exemplary embodiment the transverse grooves 24 are formed to run along the tire width direction V. Portions at each of the two ends of the transverse grooves 24 are either in communication with the circumferential direction grooves 22 or the ends thereof extend past the edges of the tread T at the outside in the tire width direction, so as to be able to discharge water therefrom.

The reference here to the edges of the tread refers to outermost edges of the road contact portion in the tire width direction when a pneumatic tire is mounted to a standard rim, as defined in the JATMA YEAR BOOK (2006 edition, Japan Automobile Tire Manufacturers Association standards), inflated to a pressure (maximum pressure) corresponding to 100% of the maximum load (load shown in bold in the internal pressure-loading force correspondence table) for the applicable JATMA YEAR BOOK size/ply rating, when the maximum load is applied thereto. It should be noted that where the location of use or manufacturing location use TRA standards or ETRTO standards, then accordance is made to these respective standards.

A large number of blocks 26 are formed in the tread 16 by the circumferential direction grooves 22 and the transverse grooves 24, as shown in FIG. 2.

Figure 3:
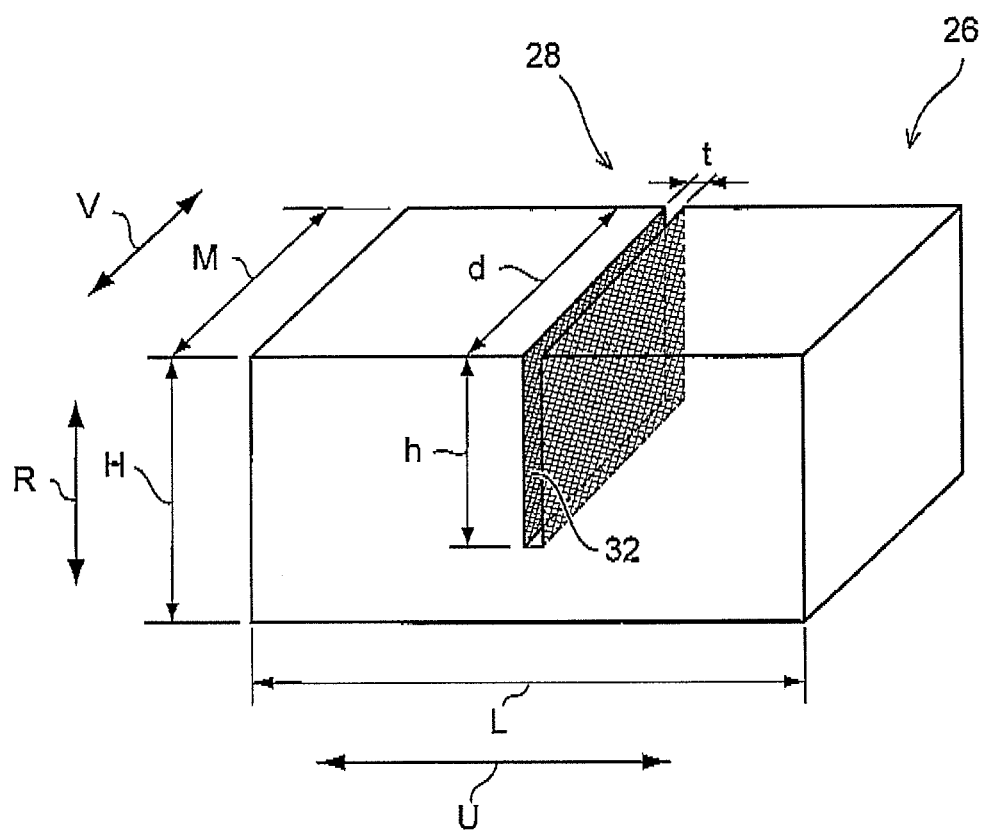
FIG. 3 is a perspective view of a block configuring a tread of a pneumatic tire according to the first exemplary embodiment (in which the block is in a state placed at the top side of the tire).

As shown in FIG. 2 and FIG. 3, each of the blocks 26 is formed with a sipe 28 running along the direction of the transverse grooves 24. The sipes 28 are so-called "open sipes", with both ends of each of the sipes 28 opening into and communicating with the circumferential direction grooves 22 at the walls at both sides of the block. In the present exemplary embodiment there is one of the sipes 28 formed for each of the blocks 26. In the present exemplary embodiment the sipes 28 are formed to run along the tire width direction V.

As shown in FIG. 3 to FIG. 7, a fine structure 32 is formed at both wall faces of the sipe 28. In the present exemplary embodiment the fine structure 32 is of a mesh shape, and is integrally formed to the block 26.

Figure 4:
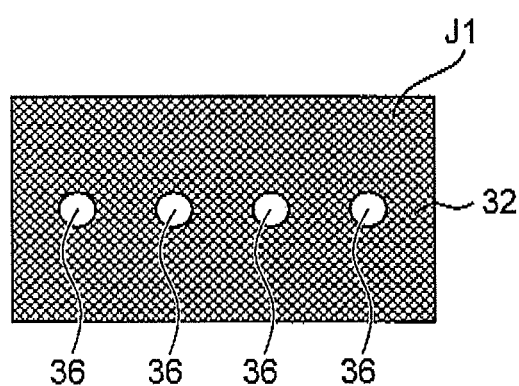
FIG. 4 is a front view of a fine structure of a pneumatic tire according to the first exemplary embodiment.
Figure 5:
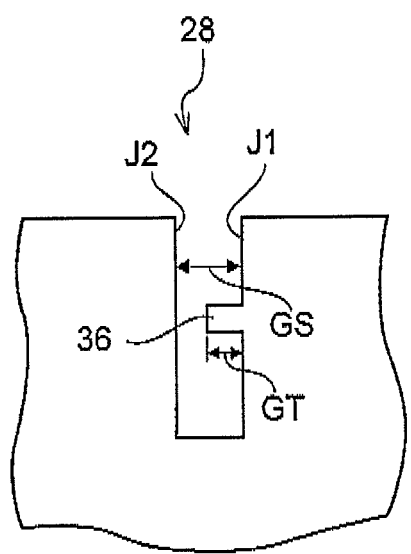
FIG. 5 is a schematic side view showing sipe structure in a pneumatic tire according to the first exemplary embodiment.
Figure 6:
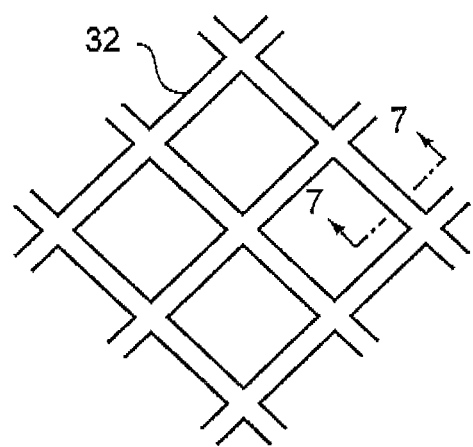
FIG. 6 is an enlarged diagram of a portion of FIG. 4.

As shown in FIG. 4 and FIG. 5, projections 36 of a height GT that is half a sipe width GS, or greater, are formed to one wall face J1 of the sipe 28. The projections 36 are formed so as to face towards an opposing wall face J2.

Figure 7:
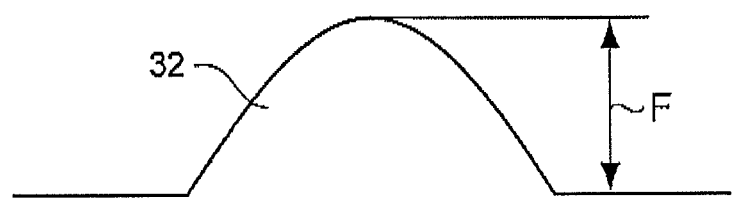
FIG. 7 is an explanatory diagram showing the fundamental height of the fine structure in a cross-section viewed along arrows 7-7 of FIG. 6.

As shown in FIG. 7, a height of a fundamental (fundamental height) F of the fine structure 32 is a height in the range of from $1/50$ of the sipe width to less than $1/10$ of the sipe width.

It should be noted that the height of the fine structure 32 is more preferably a height set as a fundamental height in the range of $1/40$ to $3/40$ of the sipe width, and is even more preferably a height set as a fundamental height in the range of $1/20$ to $1/16$ of the sipe width.

In order to form the fine structures 32 on the wall faces of the sipes 28, the fine structures 32 can be easily formed by making the surface profile of a blade of a vulcanization mold for forming the sipes 28 of a profile corresponding to the fine structures 32.

Operation and Effect

Explanation will now be given of the operation and effect of the pneumatic tire 10 according to the present exemplary embodiment, when mounted to a vehicle and running on an icy road surface.

Figure 8:
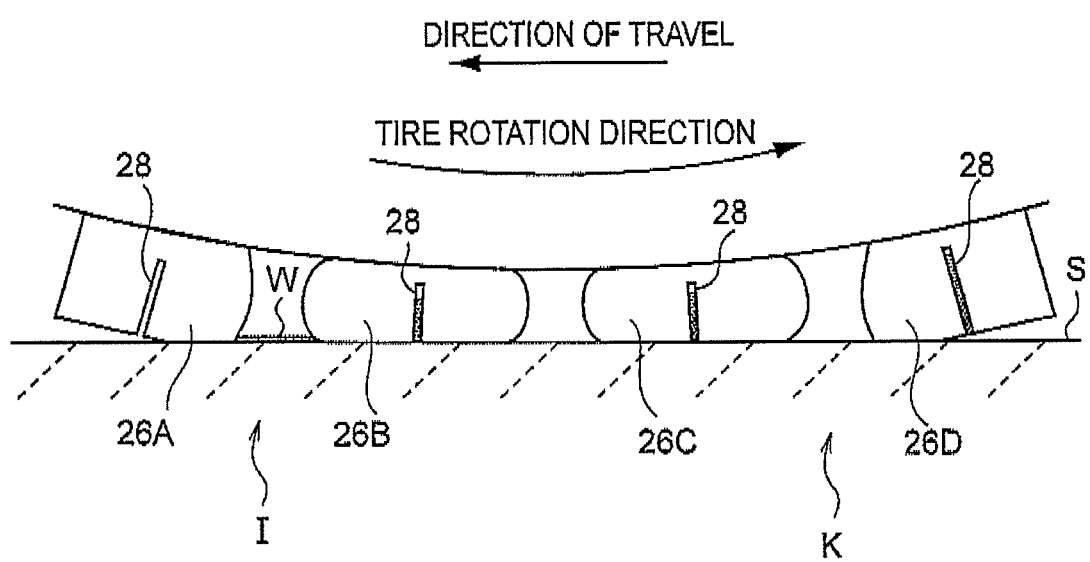
FIG. 8 is a schematic partial side face cross-section showing a pneumatic tire according to the first exemplary embodiment in rolling motion over an icy road surface.

As shown in FIG. 8, the blocks 26 (26A to D) make contact with the icy road surface S, and a water film W is generated on the icy road surface S when the blocks 26 move from the tire tread-in side I to the tire kick-out side K.

Here, in the present exemplary embodiment, since the above fine structures 32 are formed on the wall faces of the sipes 28, the fluid friction resistance of water at the surface of these fine structures 32 is low in comparison to cases where the fine structures 32 are not formed. Consequently, water forming the water film W is readily sucked into the sipes 28, is sucked into the sipes 28 with a higher water sucking up speed than is the case conventionally, and the amount of water sucked up by the sipes 28 is greater than is the case conventionally. Consequently, when the water film W is generated on the icy road surface S at the tire kick-out side K, a large amount of this water film W is rapidly sucked up into the sipes 28 and removed from the icy road surface S. The frictional force at the tire kick-out side K between the blocks 26 and the icy road surface S is thereby be raised, suppressing slipping of the blocks 26 relative to the road surface, and raising the braking performance (frictional characteristics). This result is seen to be particularly significant at temperatures in the vicinity of 0° C., where there is a large amount of water generated.

As explained above, in the present exemplary embodiment, the fluid friction resistance of the sipe wall faces is reduced by forming the fine structures 32 on the wall faces of the sipes that exhibit water discharging properties. By so doing, water sucking up properties can be raised further than is the case conventionally, and braking performance on ice can be raised further than is the case conventionally.

The fine structures 32 are also open sipes, with the both ends of the sipes 28 open to the circumferential direction grooves 22. Consequently, air inside the sipes 28 that has accompanied the sucking up of water is driven out from both ends of the sipes 28 toward the circumferential direction grooves 22. Consequently, the amount of water sucked up and the speed of water sucking up can be made higher in comparison to closed sipes, sipes with both ends not open to the circumferential direction grooves 22.

The wall face J1 of the sipe 28 is also formed with the projections 36, having a height GT that is one half of the sipe width GS or greater. Thereby, during tire rotational motion, even if the wall faces J1, J2 forming the sipes 28 approach each other, the wall faces J1, J2 can be sufficiently prevented from making contact with each other due to the projections. Consequently, as well as being able to secure a water discharge volume in the sipes 28, a flow path to the inside of the sipes 28 is secured, and the braking performance on ice is even further raised.

Since the projections 36 are formed facing the opposing wall face J2 (in other words formed in the shape of tusks), mutual contact of the wall faces J1, J2 with each other can be further prevented.

Figure 9:
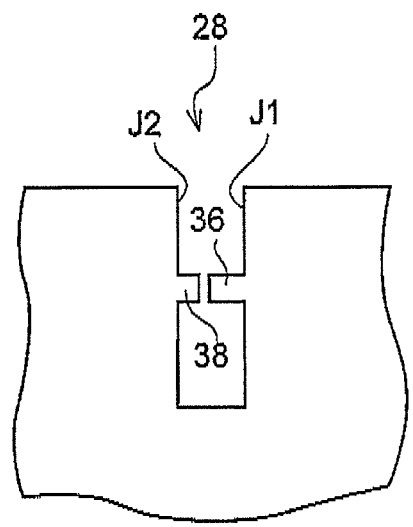
FIG. 9 is a schematic side view showing sipe structure in separate modified example of the pneumatic tire according to the first exemplary embodiment.

Note that, as shown in FIG. 9, when opposing projections 38 are formed at positions facing these projections 36 then this effect can be enhanced.

Figure 10:
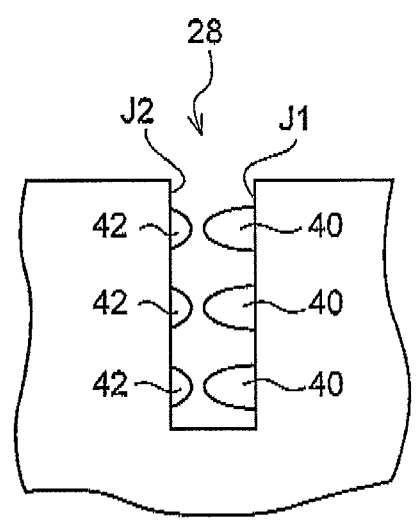
FIG. 10 is a schematic side view showing sipe structure in yet another separate modified example of the pneumatic tire according to the first exemplary embodiment.

Also, as shown in FIG. 10, plural sets of projections 40, 42 may be formed at positions mutually face each other. In such cases, a construction may be made in which the height of the projections 40, 42 is different for each position in the sipe depth direction (for example a construction in which the height of the projections 40, 42 is made higher the deeper the position within the sipe).

Test Example 1

In order to confirm the effect of the present exemplary embodiment, the present inventors prepared two examples of pneumatic tires according to the first exemplary embodiment (referred to below as tires of Examples 1, 2), three examples of pneumatic tires for comparison (referred to below as tires of Comparative Examples 1 to 3), and one example of a conventional pneumatic tire (see FIG. 13 and FIG. 14, referred to below as Conventional Example 1), performed tests of braking performance on an icy road, and evaluated the braking performance. The tire of Conventional Example 1 is a tire that is not formed with the fine structures 32 on the wall faces of the sipes 28 in the tire of Test Example 1 at blocks 86 formed in the tread. The tire conditions for each of the tires are as shown in Table 1. Note that the projections explained in the first exemplary embodiment are formed on the sipe wall faces for all the tires except for the tire of Conventional Example 1.

With regard to the block dimensions, the tire of Example 1, as shown in FIG. 3, has a tire circumferential direction length L of 25 mm, a tire width direction length M of 20 mm, and a depth in the tire radial direction (block height) H of 10 mm. With regard to the block dimensions of the tires of Examples 2, the tires of Comparative Examples 1 to 3, and the tire of Conventional Example 1, these also all had the same block dimensions (values of L, M, H) as those the tire of Example 1.

Figure 13:
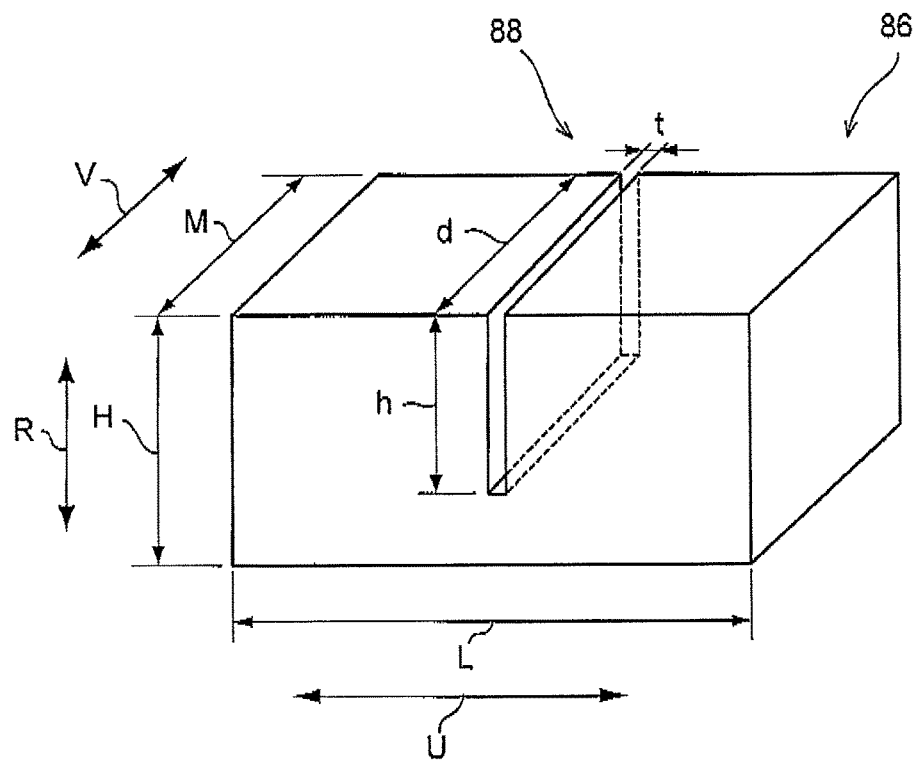
FIG. 13 is a perspective view of a block configuring a tread of a conventional pneumatic tire (in which the block is in a state placed at the top side of the tire).

As shown in FIG. 3, with regard to the sipe depth h, this was set at 6 mm, the same for all of the tires of Examples 1, 2, the tires of Comparative Examples 1 to 3 and the tire of Conventional Example 1 (see FIG. 13). With regard to the sipe width t, this was set at 0.4 mm, the same for all of the tires of Examples 1, 2, the tires of Comparative Examples 1 to 3 and the tire of Conventional Example 1. With regard to the sipe length d, this was set at the length M of the blocks in the tire width direction, the same for all of the tires of Examples 1, 2, the tires of Comparative Examples 1 to 3 and the tire of Conventional Example 1.

In the present test examples, all of the tires were of a tire size of 195/65R15, were mounted to a standard rim at an internal pressure of 200 kPa, and tests were performed by actual running when fitted to a vehicle and in a state of loading with the normal load. The reference to "standard rim" here refers to a standard rim of applicable size as defined for example in the 2006 edition of the JATMA published YEAR BOOK, and "normal load", in a similar manner, refers to the maximum load for the applicable size/ply rating as defined in the YEAR BOOK published by JATMA in 2006.

In the present Test Examples, braking distance was measured with full braking applied from an initial speed of 40 km/h until a state of rest, with the average deceleration calculated from the initial speed and the braking distance. Evaluation indices were calculated to give a relative evaluation of tires of Examples 1, 2 and the tires of Comparative Examples 1 to 3 in an index based on the average deceleration of the tire of Conventional Example 1 being an index value of 100. The results of the evaluation are shown together in Table 1.

The greater the evaluation index in the evaluation results of Table 1, the higher the performance on ice, namely this shows a shorter braking distance and superior braking performance. As can be seen from Table 1, the tires of Examples 1, 2 have higher evaluation indices and raised braking performance on ice in comparison to the tire of Conventional Example 1.

Figure 14:
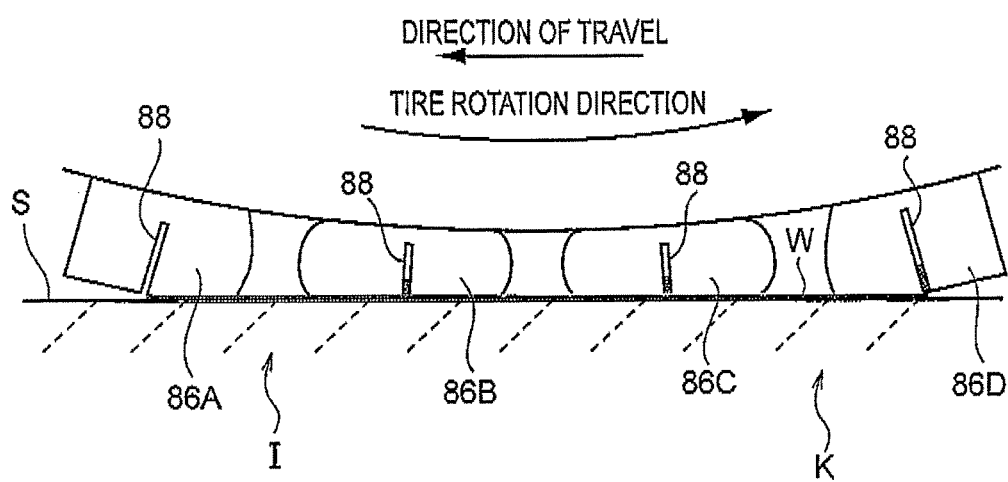
FIG. 14 is a schematic partial side face cross-section showing a conventional pneumatic tire in rolling motion over an icy road surface.

Consequently, since with the tire of Conventional Example 1, as shown in FIG. 14, the amount of water that the sipes 88 can such up is small, the water film W at the tire kick-out side K between the blocks 86 (86A to D) and the icy road surface S could not be sufficiently removed, however it

TABLE 1

| | Tire | | | | | |
|---|---|---|---|---|---|---|
| | Tire of Conventional Example 1 | Tire of Comparative Example 1 (fundamental height F of fine structure 4 μm) | Tire of Example 1 (fundamental height F of fine structure 8 μm) | Tire of Example 2 (fundamental height F of fine structure 20 μm) | Tire of Comparative Example 2 (fundamental height F of fine structure 40 μm) | Tire of Comparative Example 3 (fundamental height F of fine structure 60 μm) |
| Evaluation Index | 100 | 100 | 102 | 108 | 100 | 98 | can be concluded that the tires of Examples 1, 2 can remove more of the water film W in comparison to the tire of Conventional Example 1.

Then, from Table 1, the resulting conclusion was made that the proportion of the fundamental height of the fine structure in the sipe width is preferably in the range of from 1/50 of the sipe width to less than 1/10 of the sipe width.

Also, in the present test examples, when tests were performed with tires in which the fundamental height F of the fine structure was changed to 10 μm in comparison to that of the tires of Examples 1, 2 the evaluation index was 104. Furthermore, when tests were performed with tires in which the fundamental height F of the fine structure was changed to 30 μm in comparison to that of the tires of Examples 1, 2 the evaluation index was 105. Consequently, the result is that the proportion of the fundamental height of the fine structure in the sipe width is more preferably in the range of 1/40 to 3/40.

Also, in the present Test Examples, the tire of Example 2 had the highest evaluation index, and conclusion is made that it is most effective when the fundamental height of the fine structure 32 is about 1/20 of the sipe width. It is further concluded from the present Test Examples that the fundamental height of the fine structure 32 is also preferably from 1/20 to 1/16 of the sipe width.

However, for the tire of Comparative Example 1, the evaluation index is the same as that of the tire of Conventional Example 1, and it is concluded that the fundamental height of the fine structure 32 with respect to the sipe width is not sufficient. The tire of Comparative Example 3 also has a lower evaluation index than that of the tire of Conventional Example 1, and it is concluded that the fundamental height of the fine structure 32 with respect to the sipe width is too high, and this actually impedes water flowing into the sipes.

Test Examples 2

The present inventors have inferred, due to tests such as the following, the relationship between the proportion of the fundamental height of the fine structure in the sipe width, and the fluid friction coefficient μ of water against the sipe wall faces.

First, tubes made from rubber and having a slit shaped flow path were constructed with the fine structure 32 formed over the entire surface of the tubing inner wall faces. When this was done, plural tubes where made, with the fundamental height F of the fine structure 32 was varied as a parameter. The flow path cross-sectional dimensions of these tubes were made to be the same dimensions as the specified opening of the sipes 28 in Test Example 1.

In the present test example, ordinary tube, with the same cross-sectional shape of the flow path as the above tubes and to which no fine structure was formed, was connected as tubes for approach sections before and after the above tubes, and water was made to flow therethrough at a constant pressure. The fluid friction coefficient μ of the water at the internal wall was derived for each of the tubes with varied parameter of the fundamental height F of the fine structure 32.

Figure 11:
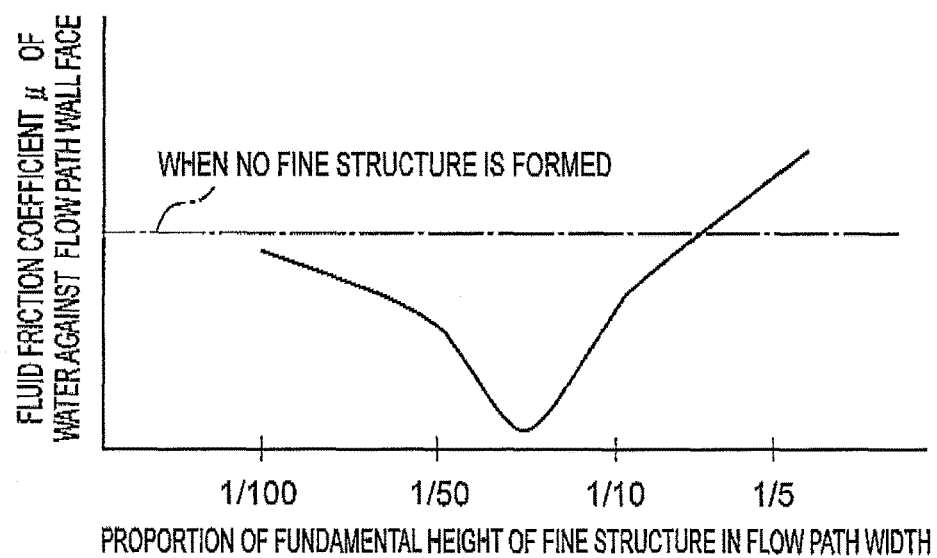
FIG. 11 is a graph showing a relationship between the fundamental height of a fine structure with respect to the sipe width against the fluid friction coefficient of water with respect to a sipe wall face in a Test Example 2.
Figure 12:
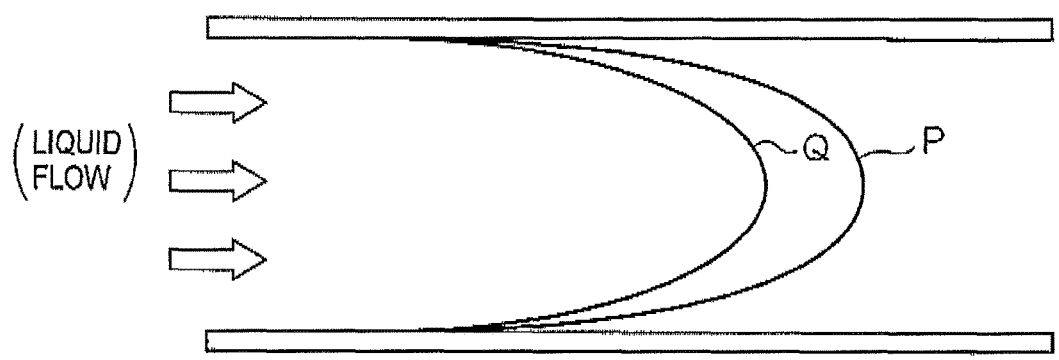
FIG. 12 is a schematic side view showing a fluid velocity distribution between two flat parallel plates.

The results of the test are shown in FIG. 11. As can be seen from FIG. 11, fluid friction coefficient μ rapidly decreases within the range from 1/50 of the sipe width to less than 1/10 of the sipe width for the proportion of the fundamental height F of the fine structure 32 in the flow path width, in comparison to the other adjacent ranges. Consequently, the result concluded is that the proportion of the fundamental height of the fine structure in the sipe width is preferably in the range of from 1/50 of the sipe width to less than 1/10 of the sipe width.

Second Exemplary Embodiment

Figure 15:
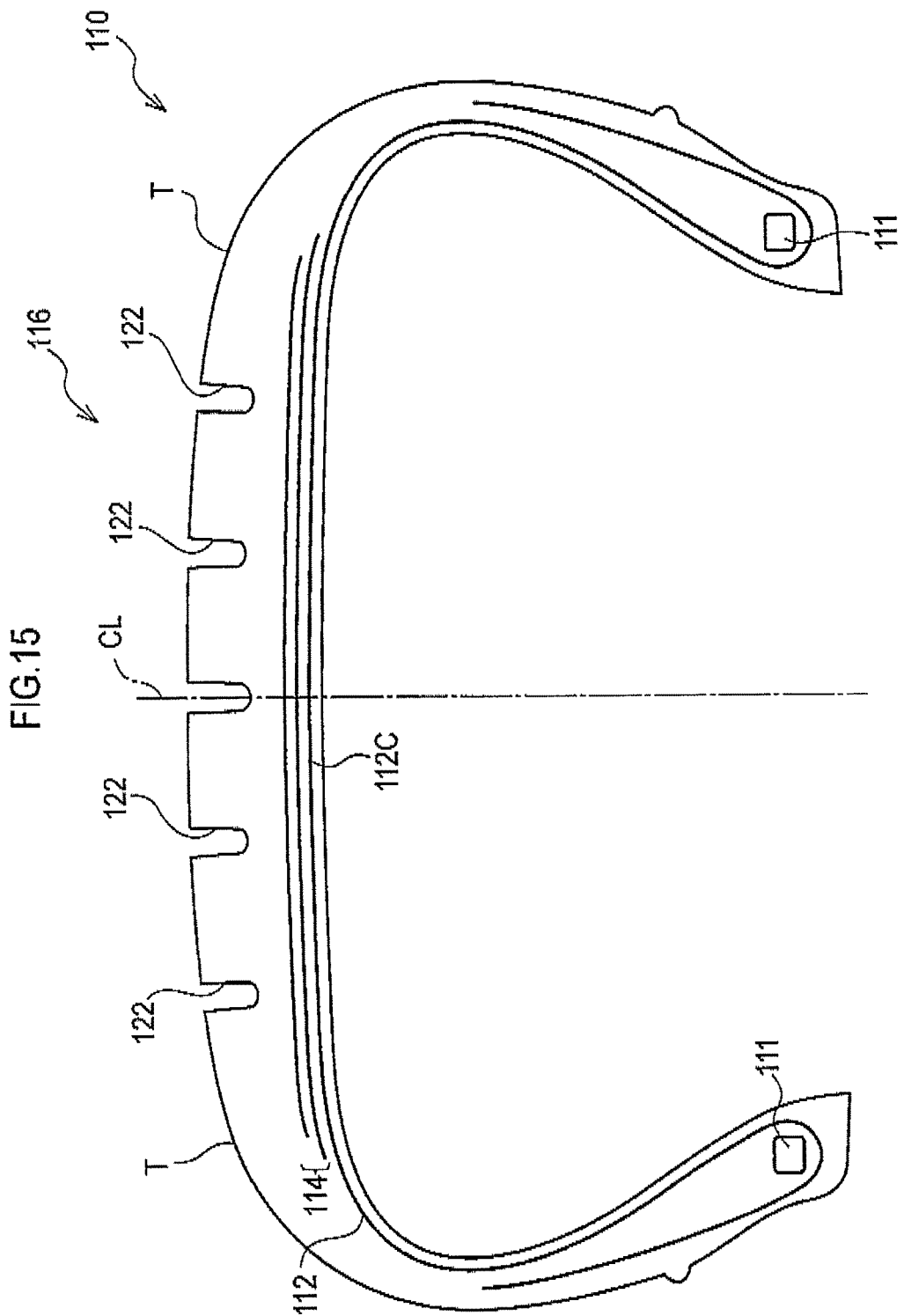
FIG. 15 is a tire radial direction cross-section of a pneumatic tire according to a second exemplary embodiment.

Explanation will now be given of a second exemplary embodiment. As shown in FIG. 15, a pneumatic tire 110 according to the present exemplary embodiment is equipped with a carcass 112 configured from a single layer, or from plural layers, wrapped around bead cores 111 at each edge thereof.

A belt layer 114 is buried within the tire at the tire radial direction outside of a crown portion 1120 of the carcass 112, the belt layer 114 being configured with plural overlapping sheets (for example two sheets) of belt ply.

Figure 16:
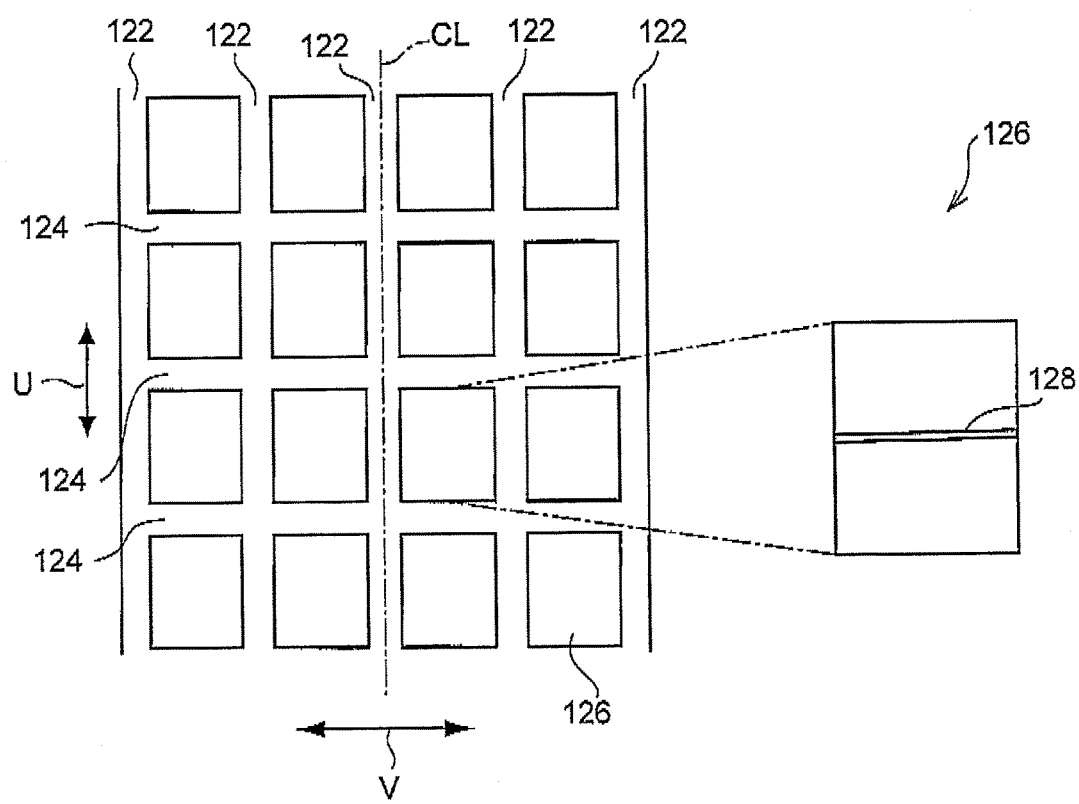
FIG. 16 is an explanatory diagram showing a block disposition of a tread of a pneumatic tire according to a second exemplary embodiment, seen in plan view.

A tread 116 is formed at the tire radial direction outside of the belt layer 114, and grooves are disposed in the tread 116. The tread 116, as shown in FIG. 16, has plural circumferential direction grooves (main grooves) 122 formed so as to run along the tire circumferential direction U on the plane of the tire equator CL, and on both sides thereof. Plural transverse grooves 124 are also formed in the tread 116 intersecting with the tire circumferential direction U. In the present exemplary embodiment the transverse grooves 124 are formed to run along the tire width direction V. Portions at each of the two ends of the transverse grooves 124 are either in communication with the circumferential direction grooves 122 or the ends thereof extend past the edges of the tread T at the outside in the tire width direction, so as to be able to discharge water therefrom.

A large number of blocks 126 are formed in the tread 116 by the circumferential direction grooves 122 and the transverse grooves 124, as shown in FIG. 16.

Figure 17:
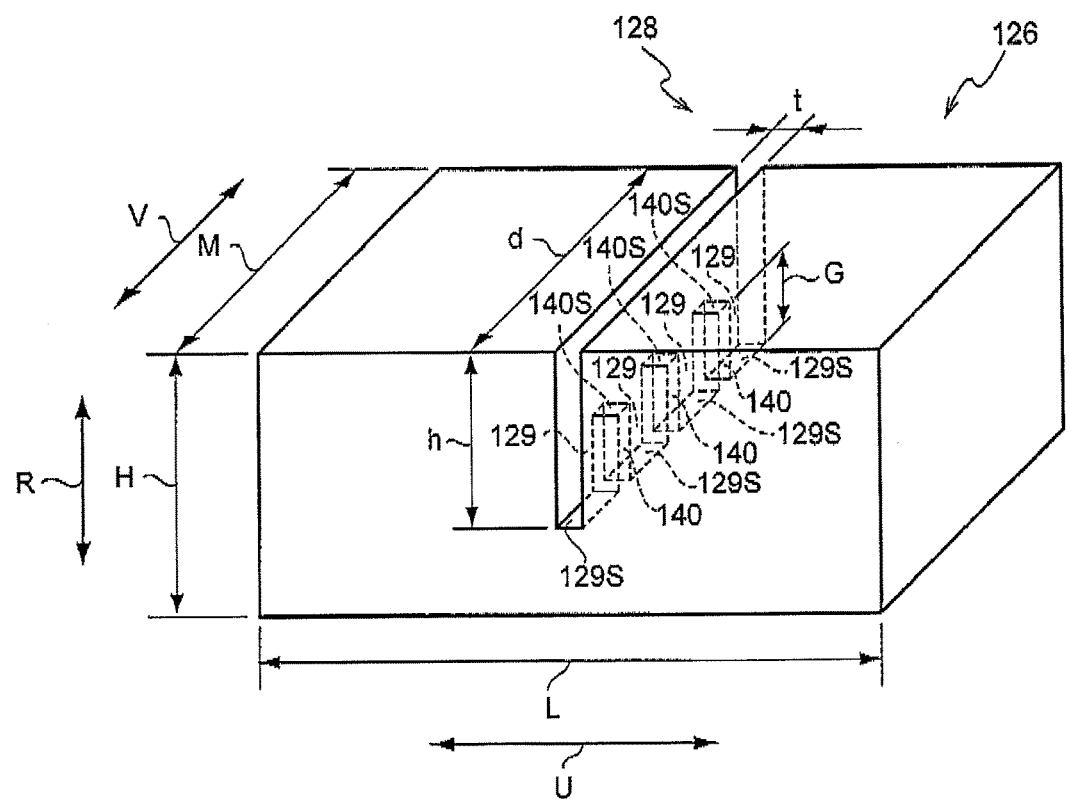
FIG. 17 is a perspective view of a block configuring a tread of a pneumatic tire according to a second exemplary embodiment (in which the block is in a state placed at the top side of the tire).
Figure 18:
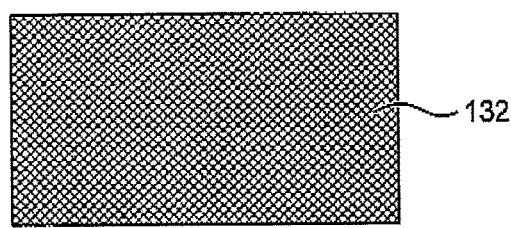
FIG. 18 is an explanatory diagram of a fine structure forming a sipe wall face in a pneumatic tire according to a second exemplary embodiment.
Figure 19:
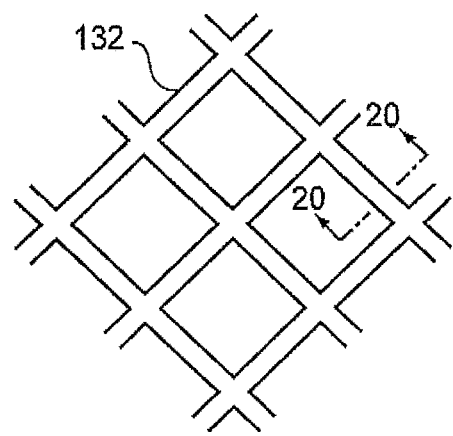
FIG. 19 is an enlarged diagram of a portion of FIG. 18.

As shown in FIG. 16 and FIG. 17, each of the blocks 126 is formed with a sipe 128 running along the direction of the transverse grooves 124. The sipes 128 are so-called "open sipes", with both ends of each of the sipes 128 opening into and communicating with the circumferential direction grooves 122 at the walls at both sides of the block. In the present exemplary embodiment there is one of the sipes 128 formed for each of the blocks 126. In the present exemplary embodiment the sipes 128 are formed to run along the tire width direction V.

As shown in FIG. 17 to FIG. 20, a fine structure 132 is formed at both wall faces of the sipe 128. In the present exemplary embodiment the fine structure 132 is of a mesh shape, and is integrally formed to the block 126.

Figure 20:
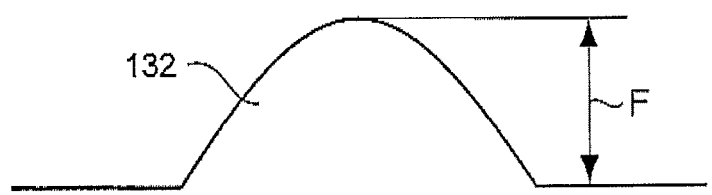
FIG. 20 is an explanatory diagram showing the fundamental height of the fine structure in a cross-section viewed along arrows 20-20 of FIG. 19.

As shown in FIG. 20, a height of a fundamental (fundamental height) F of the fine structure 132 is a height in the range of from 1/50 of the sipe width to less than 1/10 of the sipe width.

In order to form the fine structures 132 on the wall faces of the sipes 128, the fine structures 132 can be easily formed by making the surface profile of a blade of a vulcanization mold for forming the sipes 128 of a profile corresponding to the fine structures 132.

As shown in FIG. 17, standing projections 140 are formed to each of the sipes 128, connected to the sipe groove bottoms. The standing projections 140 are of a thin elongated bar shape extending out toward the tire radial direction outside. Consequently, a construction is achieve in which, during tire rotational movement, mutual contact of the wall faces of the sipes 128 with each other can be avoided due to the standing projections 140.

In the present exemplary embodiment, a height G from the sipe groove bottoms of the standing projections 140 is within a range of 30 to 90% of the sipe depth h. Plural of the standing projections 140 are also provide at a substantially even spacing, and as a result, voids 129 are formed at both sides in the sipe width direction of each of the standing projections 140, with the sipes 128 formed as a comb-shaped void.

The top face (face on the tire radial direction outside) of the standing projection 140 is formed as a flat face. As a result of this shallow groove bottom face portions 140S and deep groove bottom face portions 129S are formed to the sipes 128.

Note that the standing projections 140 may be formed integrally to the wall face on one side of the sipe.

Operation and Effect

Explanation will now be given of the operation and effect of the pneumatic tire 110 according to the present exemplary embodiment, when mounted to a vehicle and running on an icy road surface.

Figure 21:
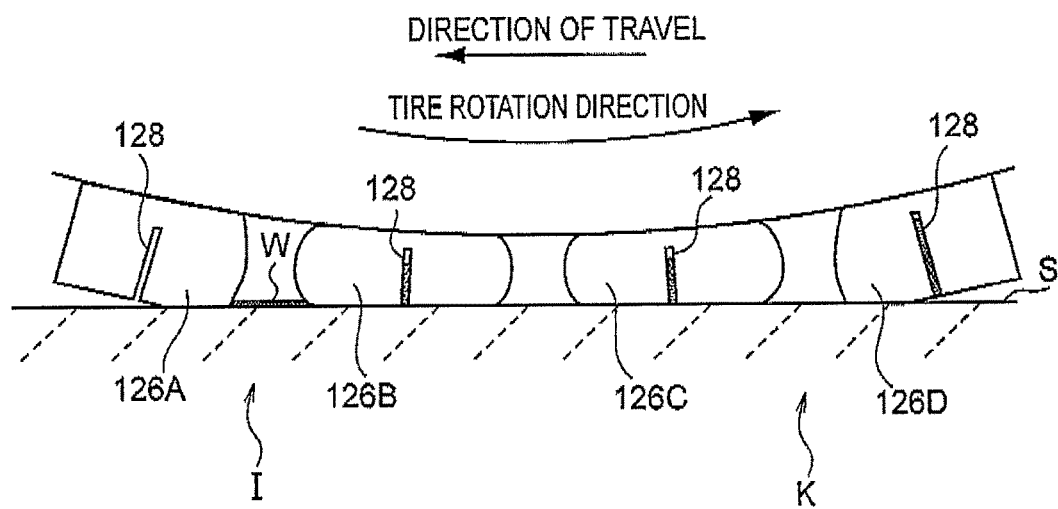
FIG. 21 is a schematic partial side face cross-section showing a pneumatic tire according to a second exemplary embodiment in rolling motion over an icy road surface.

As shown in FIG. 21, the blocks 126 (126A to D) make contact with the icy road surface S, and a water film W is generated on the icy road surface S when the blocks 126 move from the tire tread-in side I to the tire kick-out side K.

Here, in the present exemplary embodiment, since the above fine structures 132, having the fundamental height F in the range of from 1/50 of the sipe width to less than 1/10 of the sipe width, are formed on the wall faces of the sipes 128, the fluid friction resistance of water at the surface of these fine structures 132 is low in comparison to cases where the fine structures 132 are not formed. Consequently, water forming the water film W is readily sucked into the sipes 128, is sucked into the sipes 128 with a higher water sucking up speed than is the case conventionally, and the amount of water sucked up by the sipes 128 is greater than is the case conventionally. Consequently, when the water film W occurs on the icy road surface S at the tire kick-out side K, a large amount of this water film W is rapidly sucked up into the sipes 128 and removed from the icy road surface S. The frictional force at the tire kick-out side K between the blocks 126 and the icy road surface S can thereby be raised, suppressing slipping of the blocks 126 relative to the road surface, and raising the braking performance (frictional characteristics). This result is seen to be particularly significant at temperatures in the vicinity of 0° C., where there is a large amount of water generated. In addition, the sipe wall faces are prevented from touching each other by the standing projections 140 formed to each of the sipes 128, effectively preventing the sipe volume from becoming smaller.

As explained above, in the present exemplary embodiment, the fluid friction resistance of the sipe wall faces is reduced by forming the fine structures 132 on the wall faces of the sipes that exhibit water discharging properties. By so doing, the water sucking up properties can be raised further than is the case conventionally, and braking performance on ice can be raised further than is the case conventionally.

Also, in each of the sipes 128, the standing projections 140 are formed continuous to the sipe groove bottom. Thereby, during tire rotational movement, mutual contact of the wall faces of the sipes 128 with each other can be avoided due to the standing projections 140. Consequently, as well as being able to secure a water discharge volume in the sipes 128, a flow path to the inside of the sipes 128 is secured, and the braking performance on ice is even further raised.

The height G of the standing projections 140 from the sipe groove bottom is also in the range of 30 to 90% of the sipe depth h. By so doing, contact of the sipe wall faces with each other can be sufficiently avoided, and sufficient water discharge volume can be secured. However, impeding of flow and a reduction in water discharge performance is avoided.

In addition, the standing projections 140 extend out toward the outside in the tire radial direction from the groove bottoms, the voids 129 are formed at both sides in the sipe width direction of the standing projections 140, and the sipes 128 are formed as a comb-shaped void. Consequently, even though the sipes 128 are formed to the blocks 126, tilting in of the blocks 126 is prevented by the standing projections 140, while sipe volume can be secured.

Furthermore, the sipes 128 are open sipes, with both ends of the sipes 128 open to the circumferential direction grooves 122. Consequently, air inside the sipes 128 that has accompanied the sucking up of water is driven out from both ends of the sipes 128 toward the circumferential direction grooves 122. Consequently, the amount of water sucked up and the speed of water sucking up can be made higher in comparison to closed sipes, sipes with both ends not open to the circumferential direction grooves 122.

Third Exemplary Embodiment

Figure 22:
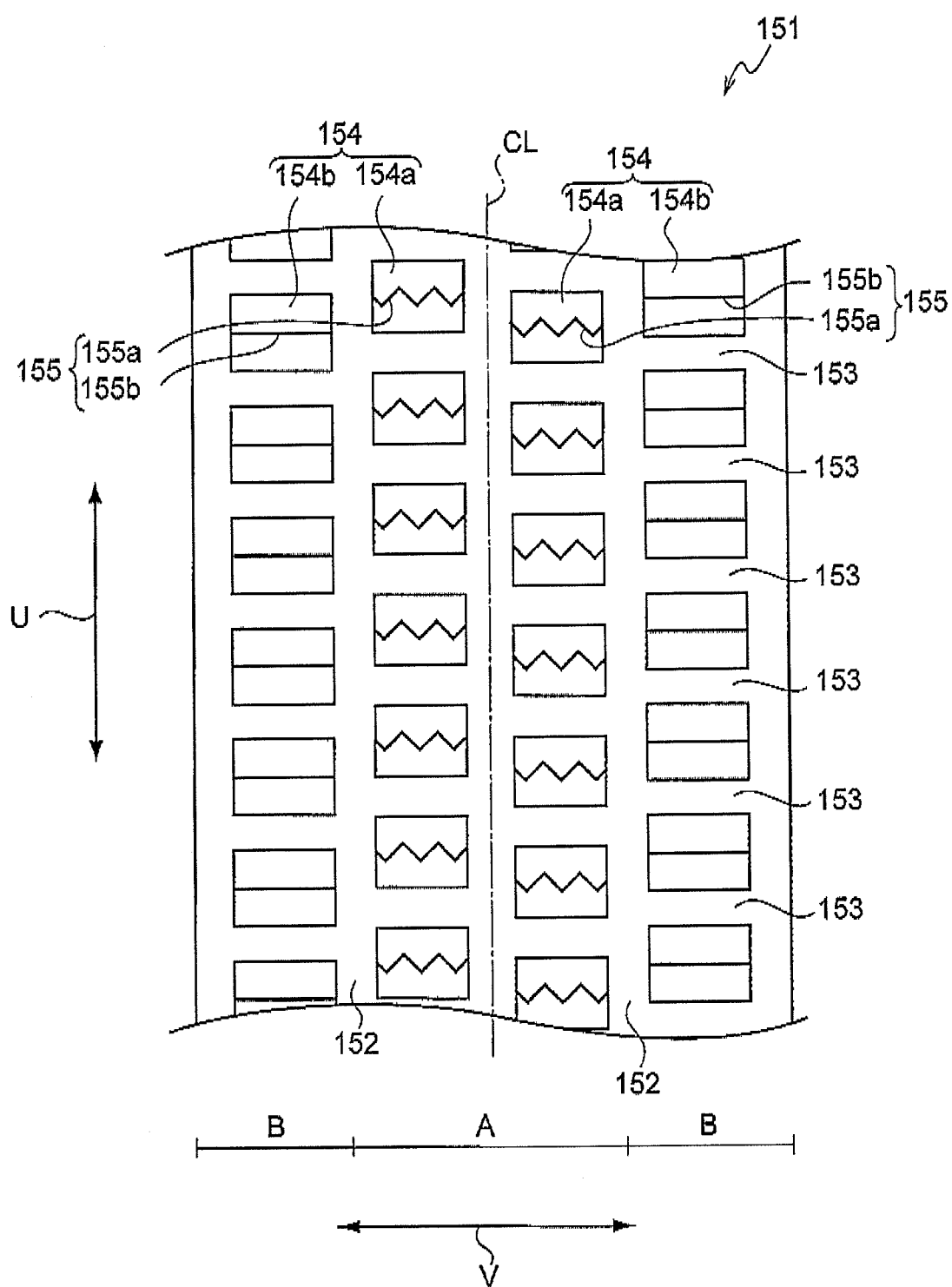
FIG. 22 is a plan view showing a tread of a pneumatic tire according to a third exemplary embodiment.

Explanation will now be given of a third exemplary embodiment. FIG. 22 is a diagram showing a tread of a pneumatic tire 151 in the present exemplary embodiment.

Circumferential direction grooves 152, transverse grooves 153, and blocks 154 are formed to the tread of the pneumatic tire 151.

The circumferential direction grooves 152 are grooves that extend along the tire circumferential direction (the direction of arrow U). The transverse grooves (width direction grooves) 153 are grooves that extend along the tire width direction (the direction of arrow V). The blocks 154 are blocks partitioned by the intersection of the circumferential direction grooves 152 and the transverse grooves 153, and are blocks having sipes 155. The blocks 154 are configured with central region blocks 154a and edge region blocks 154b.

The central region blocks 154a are blocks formed at a central region A of the tread. The edge region blocks 154b are blocks formed at edge regions B of the tread.

The groove width of the sipes 155 formed to the central region blocks 154a is wider that the groove width of the sipes 155 formed to the edge region blocks 154b. At least the sipes 155 formed to the central region blocks 154a are 3-dimensional sipes 155a that extend in a zig-zag shape in the tire width direction V, the tire circumferential direction U, and the tire radial direction. Details regarding the 3-dimensional sipes 155a will be stated later. In the same figure, the sipes 155 formed in the edge region blocks 154b are straight-line shaped sipes 155b along the tire width direction, however there is no limitation thereto, and these sipes may be configured from the 3-dimensional sipes 155a.

Note that in the present exemplary embodiment, the blocks 154 are at least blocks partitioned by the circumferential direction grooves 152, and configuration may be made without the transverse grooves 153.

Figure 23:
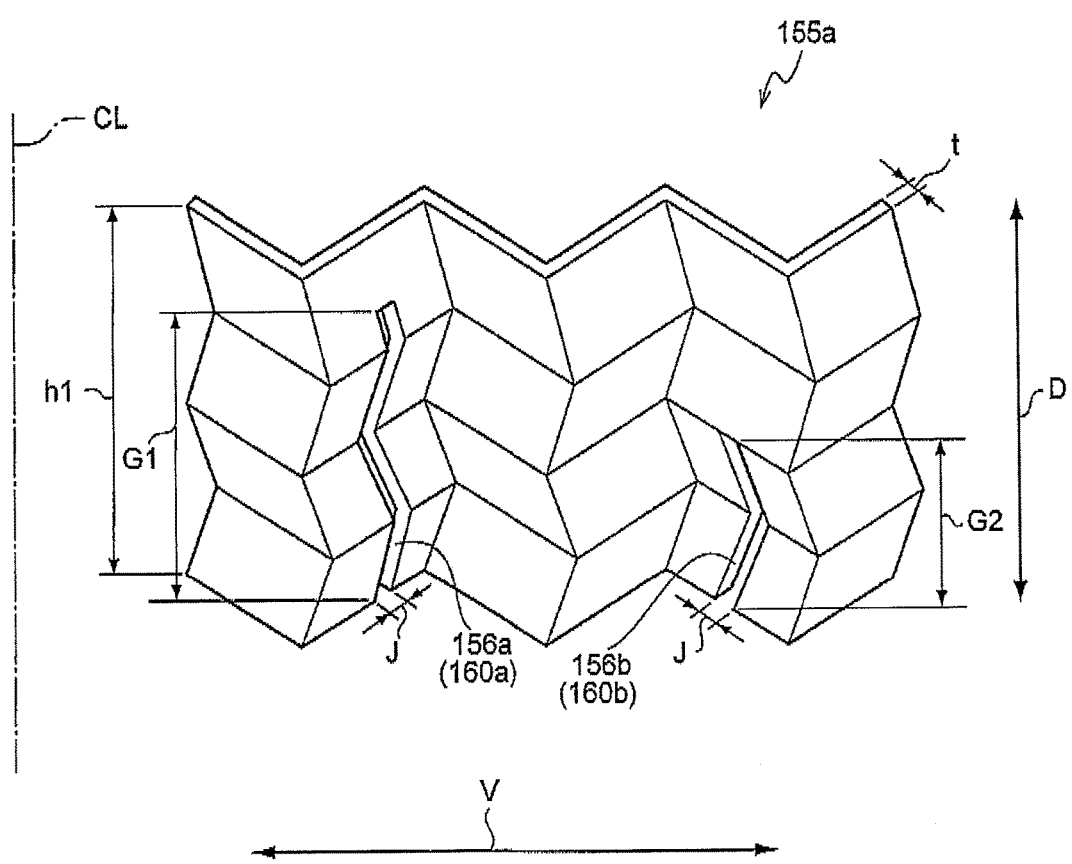
FIG. 23 is an enlarged diagram of 3-dimensional sipes of a pneumatic tire according to the third exemplary embodiment.

FIG. 23 is an enlarged diagram of the 3-dimensional sipes 155a in the present exemplary embodiment. To be precise, the 3-dimensional sipes 155a are grooves, and since they do not have form themselves, the shape shown in the same figure is actually the shape of a blade for forming the 3-dimensional sipes 155a. The 3-dimensional sipes 155a are formed in a shape by removing the blade from the blocks 154. The sipe width t may be considered to be of the same width as the blade.

Figure 24:
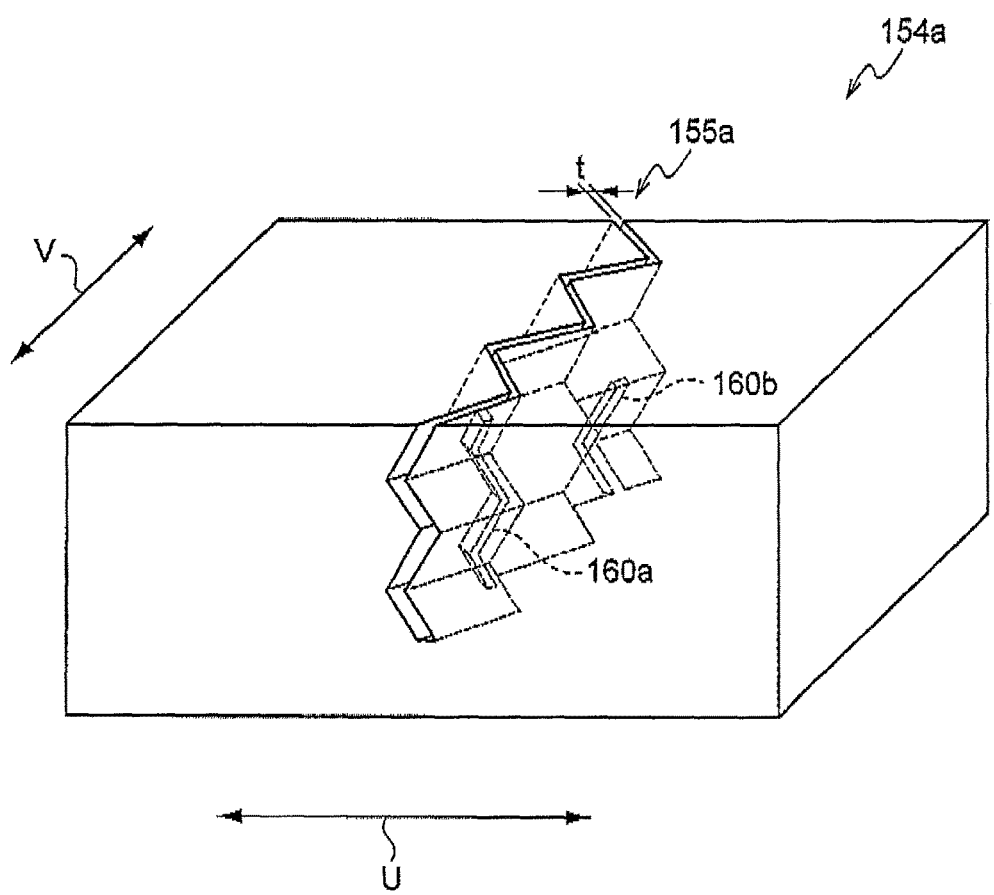
FIG. 24 is a perspective view of a block configuring a tread of a pneumatic tire according to the third exemplary embodiment (in which the block is in a state placed at the top side of the tire).

As shown in FIG. 23 and FIG. 24, the 3-dimensional sipe 155a is of a zig-zag shape extending in the tire width direction V, the tire circumferential direction and the tire radial direction D. At the inside in the tire radial direction D of the 3-dimensional sipes 155a is formed at least 1 cut-out 156 with a length in the tire radial direction D (referred to below as the depth G1 or the depth G2 of the cut-out 156) that is 50 to 90% of the length in the tire radial direction D of the 3-dimensional sipes 155a (referred to below as the depth h1 of the 3-dimensional sipes 155a), and a length in the tire width direction V (referred to below as the width J of the cut-outs 156) that is 0.3 to 1 mm. Plural standing projections 160 are formed by the cut-out 156, as shown in FIG. 24, extending out from the groove bottom of the 3-dimensional sipe 155a.

Figure 25:
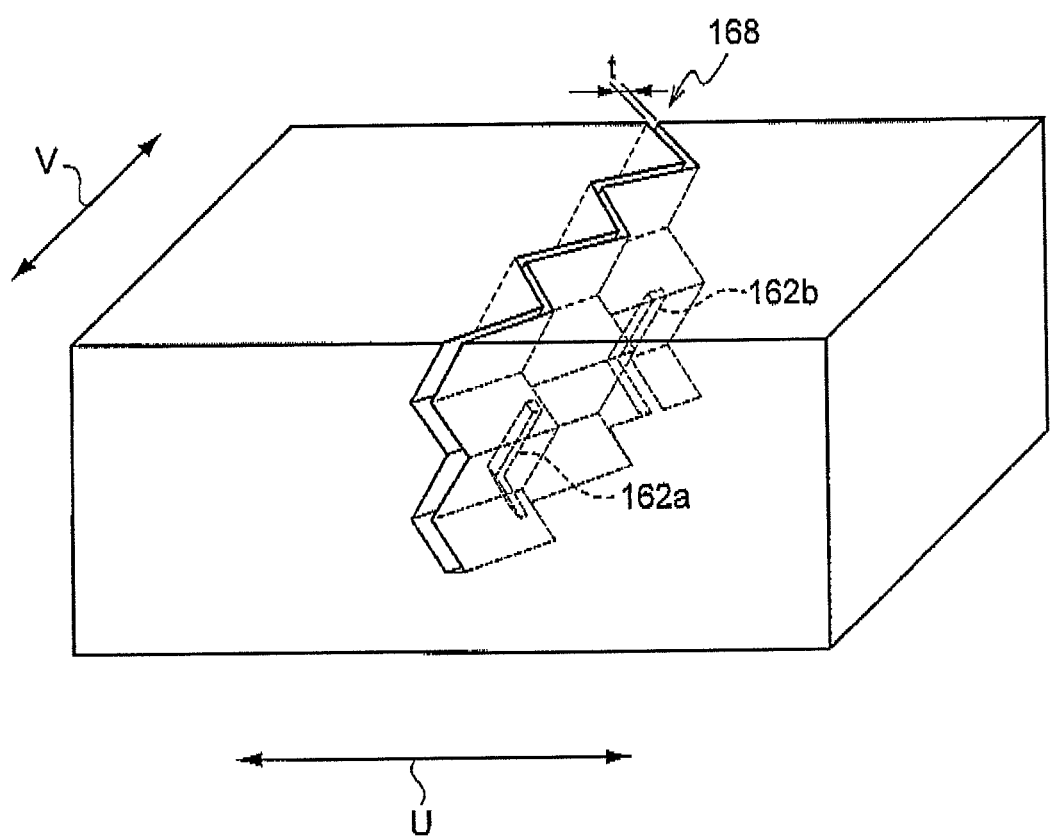
FIG. 25 is a perspective view of a modified example of a block configuring a tread of a pneumatic tire according to the third exemplary embodiment (in which the block is in a state placed at the top side of the tire).

When there are two or more of the standing projections 160 formed to a single 3-dimensional sipe 155a, as shown in FIG. 23 and FIG. 24, the height G1 of a central side standing projection 160a formed by a central side cut-out 156a is preferably higher than a height G2 of an edge side standing projection 160b formed by an edge side cut-out 156b. The central side standing projection 160a and the edge side standing projection 160b like these are easily formed by making depth G1 of the central side cut-out 156a near to the tire equatorial plane CL longer than the depth G2 of the edge side cut-out 156b. Note that, as shown in FIG. 25, a configuration in which a 3-dimensional sipe 168 is provided with a central side standing projection 162a and an edge side standing projection 162b that are of the same heights as each other, is also within the scope of the present invention.

Also, in the same manner as in the first exemplary embodiment, a fine structure (not illustrated) is formed to both wall faces of the sipes 155. In the present exemplary embodiment the fine structures are of a mesh shape, and are integrally formed to the blocks 154. A height of a fundamental (fundamental height) of the fine structures is, in the same manner as in the second exemplary embodiment, in the range of from 1/50 of the sipe width to less than 1/10 of the sipe width.

Operation and Effect

According to the pneumatic tire 151 of the present exemplary embodiment, in a similar manner to the second exemplary embodiment, the fluid friction resistance of the sipe wall faces is reduced by forming the fine structures to the wall faces of the 3-dimensional sipes 155a that exhibit water discharging properties. By so doing, the water sucking up properties can be raised further than is the case conventionally, and braking performance on ice can be raised further than is the case conventionally.

There is at least one of the standing projections 160 at the tire radial direction inside of the 3-dimensional sipe 155a, the standing projection 160 having a length in the tire radial direction that is 50 to 90% of the tire radial direction length of the 3-dimensional sipes, and having a length in the tire width direction that is 0.3 to 1 mm. By so doing, since the depth of a portion of the 3-dimensional sipes 155a can be made shallow and the rigidity of the blocks 154 can be further increased, the straight-line stability on a dry road surface can be raised. And also, mutual contact of the wall faces of the 3-dimensional sipes 155a with each other can also be avoided by the standing projections 160.

When there are two or more of the standing projections 160 formed, the central side standing projection 160a near to the tire equatorial plane CL is longer in tire radial direction length than the other edge side standing projection 160b, the edge side standing projection 160b. Therefore, by being able to raise the rigidity at the tire equatorial plane CL side of the blocks 154, any reduction in straight line stability on a dry road surface can be suppressed.

Since the groove width of the sipes 155 formed to the blocks 154 configuring a central region A of the tread are wider than the groove width of the sipes 155 formed to the blocks 154 configuring edge regions B of the tread, the sipes 155 of wider groove width can also perform a similar function to that of a groove. Namely, when running on snow, since snow is pressed hard into the sipes of wide groove width in a similar manner to into grooves, the friction between the tread and the road surface is increased, and therefore the initial braking performance can be raised.

However, by the groove width of the sipes 155 formed to the blocks 154 configuring the central region A of the tread being wider than the groove width of the sipes 155 formed to the blocks 154 configuring the edge region B of the tread, while there is a reduction in rigidity of the block 154 and a reduction in straight line stability on a dry road surface, since at least the sipes 155 formed to the blocks 154 configuring the central region A are 3-dimensional sipes 155a that are formed in a zig-zag shape in the tire width direction V, the tire circumferential direction U, and the tire radial direction D, the rigidity of the blocks 154 is raised by the blocks 154 catching on adjacent portions when they tilt over, and so the straight line stability on a dry road surface can be raised.

Test Examples 3

In order to confirm the effect of the present exemplary embodiment, the present inventors prepared three examples of pneumatic tires according to the second exemplary embodiment (referred to below as tires of Examples 3 to 5), seven examples of pneumatic tires for comparison (referred to below as tires of Comparative Examples 4 to 10), and one example of a conventional pneumatic tire (see FIG. 26 and FIG. 27, referred to below as tire of Conventional Example 2), performed tests of braking performance on an icy road, and evaluated the braking performance. The tire of Conventional Example 2 is a tire not formed with the fine structures 132 or the standing projections 140 on the blocks 186 formed in the tread of a tire of Example 3. The tire conditions with respect to each of the tires are shown in Table 2. Note that in Table 2, in tires with a void due to the standing projections, the standing projections are formed continuous to the sipe groove bottoms.

TABLE 2

| Tire | Void due to standing projections | Mesh shaped fine structure | Fundamental height F of fine structure (μm) | Evaluation index |
|---|---|---|---|---|
| Tire of Conventional Example 2 | None | None | (0) | 100 |
| Tire of Comparative Example 4 | None | Present | 4 | 100 |
| Tire of Comparative Example 5 | None | Present | 8 | 101 |
| Tire of Comparative Example 6 | None | Present | 20 | 103 |
| Tire of Comparative Example 7 | None | Present | 35 | 101 |
| Tire of Comparative Example 8 | None | Present | 60 | 97 |
| Tire of Comparative Example 9 | Present | Present | 4 | 102 |
| Tire of Example 3 | Present | Present | 8 | 105 |
| Tire of Example 4 | Present | Present | 20 | 108 |
| Tire of Example 5 | Present | Present | 35 | 104 |
| Tire of Comparative Example 10 | Present | Present | 60 | 99 |

Regarding the block dimensions, in the tire of Example 3, as shown in FIG. 17, the blocks have a tire circumferential direction length L of 25 mm, a tire width direction length M of 20 mm, and a tire radial direction depth (block height) H of 10 mm. The block dimensions (values of L, M and H) are the same as those of tire of Example 3 for all of the tires of Examples 4 and 5, the tires of Comparative Examples 4 to 10, and the tire of Conventional Example 2.

Figure 26:
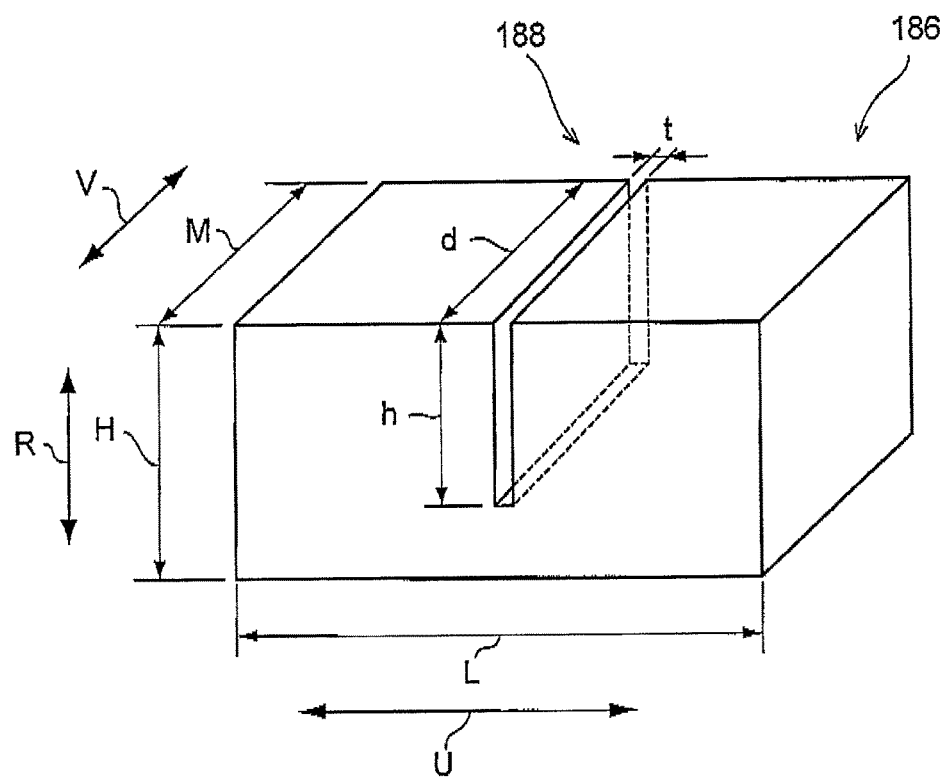
FIG. 26 is a perspective view of a block configuring a tread of a conventional pneumatic tire (in which the block is in a state placed at the top side of the tire).

As shown in FIG. 17, regarding the sipe depth h, this is 6 mm in all of tires of Examples 3 to 5, the tires of Comparative Examples 4 to 10, and tire of Conventional Example 2 (see FIG. 26). Regarding the sipe width t, this is 0.4 mm in all of the tires of Examples 3 to 5, the tires of Comparative Examples 4 to 10, and the tire of Conventional Example 2. Regarding the sipe length d, this is the same as the tire width direction length M of the blocks in all of the tires of Examples 3 to 5, the tires of Comparative Examples 4 to 10, and the tire of Conventional Example 2.

In the present Test Examples, all of the tires had a tire size of 195/65R15, were mounted to a standard rim at an internal pressure of 200 kPa, and tests were performed by actual running when fitted to a vehicle and loaded with the normal load.

In the present Test Examples, braking distance was measured with full braking applied from an initial speed of 40 km/h until a state of rest, with the average deceleration calculated from the initial speed and the braking distance. Evaluation indices give a relative evaluation of tires of Examples 3 to 5, and the tires of Comparative Examples 4 to 10 in an index based on the average deceleration of the tire of Conventional Example 2 having an index value of 100. The results of the evaluation are shown together in Table 2.

The greater the evaluation index in the evaluation results of Table 2, the higher the performance on ice, namely this shows a shorter braking distance and superior braking performance. As can be seen from Table 2, in the tires of Examples 3 to 5 that have a fundamental height F of the fine structure that is in the range of 8 to 35 μm, have higher evaluation indices and raised braking performance on ice in comparison to the tires of Conventional Example 2 and the tires of Comparative Examples 9 and 10.

Figure 27:
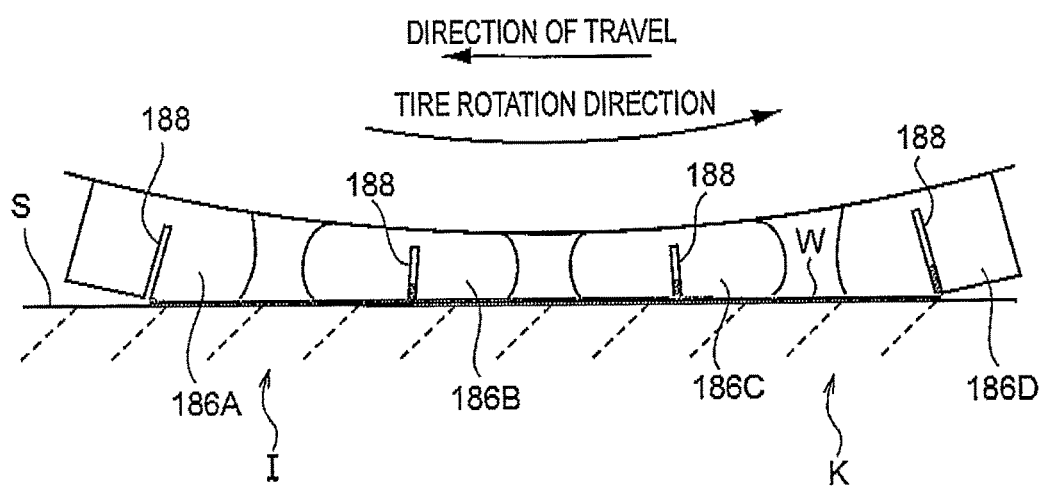
FIG. 27 is a schematic partial side face cross-section showing a conventional pneumatic tire in rolling motion over an icy road surface.

Consequently, in the tires of Conventional Example 2, as shown in FIG. 27, since the amount of water that the sipes 188 can suck up is small, the water film W at the tire kick-out side K between the block 186 (186A to D) and the icy road surface S cannot be sufficiently removed, however it can be concluded that the tires of Example 3 to 5 can remove more of the water film W in comparison to the tire of Conventional Example 2.

Also, in the present test examples, the tire of Example 4 had the highest evaluation index, and conclusion is made that it is most effective when the fundamental height of the fine structure 32 is about 1/20 of the sipe width.

Also, in the Comparative Examples 8 and 10, the evaluation indices are lower than that of the Conventional Example 2, and it is concluded that if the height of the fundamental height of the fine structure 32 with respect to the sipe width is too high, this actually impedes the flow of water within the sipes.

The tires of Comparative Example 4 to 8 also backup the preferability for the fundamental height F of the fine structures to be in the range of 8 to 35 μm.

While explanation has been given of exemplary embodiments of the present invention by way of examples, these are only examples of the exemplary embodiments, and various modifications and changes can be made within a scope that does not depart from the spirit of the invention. Obviously the present exemplary embodiments do not limit the scope of rights of the present invention.

The invention claimed is:

1. A pneumatic tire comprising:
 a tread formed with a plurality of blocks partitioned by circumferential direction grooves and transverse grooves;
 at least one sipe formed in each of the blocks;
 a standing projection formed at the bottom of the at least one sipe in a bar shape extending radially outward in the tire radial direction, and a void being formed at both sides of the standing projection in the sipe length direction that extends from a lowermost portion of the sipe to an uppermost portion of the sipe; and
 a fine structure formed on at least one portion of the wall face of the sipe with a fundamental height in the range of from 1/50 of the sipe width to less than 1/10 of the sipe width,
 wherein the fine structure is formed with a fine projections network and a plurality of hollow portions disposed in a mesh shape defined by the fine projections network, and the fine projections network projects out from the wall face of the sipe so as to form a mound shape such that a width of each link configuring the fine projections network is narrower than a distance between adjacent links,
 wherein the standing projections are configured to prevent the fine structures on one wall face from contacting an adjacent wall face.

2. The pneumatic tire of claim 1, wherein the height of the standing projection from the sipe groove bottom is in the range of 30 to 90% of the depth of the sipes.

3. The pneumatic tire of claim 1, wherein both ends of the sipes are open to the circumferential direction grooves or to the transverse grooves.

4. The pneumatic tire of claim 1, wherein the sipe width is 0.3 mm to 0.8 mm.

5. The pneumatic tire of claim 1, wherein at least one of the sipes is a 3-dimensional sipe that extends and changes shape along both directions of the sipe depth direction and the sipe length direction at the tread surface.

6. The pneumatic tire of claim 5, wherein the 3-dimensional sipe extends in a zig-zag shape in the tire width direction, the tire circumferential direction, and the tire radial direction.

7. The pneumatic tire of claim 5, wherein the height of the standing projection from the sipe groove bottom is in the range of 50 to 90% of the depth of the sipe.

8. The pneumatic tire of claim 1, wherein the fine structure is formed on both sides of the wall face of the sipe.

* * * * *